United States Patent
Dunn

(10) Patent No.: US 8,009,262 B2
(45) Date of Patent: Aug. 30, 2011

(54) FLAT PANEL DISPLAY WTIH EXTERNAL INTEGRAL HEATER

(75) Inventor: William R. Dunn, Alpharetta, GA (US)

(73) Assignee: American Panel Corporation, Alpharetta, GA (US)

(*) Notice: Subject to any disclaimer, the term of this patent is extended or adjusted under 35 U.S.C. 154(b) by 436 days.

(21) Appl. No.: 11/057,888

(22) Filed: Feb. 14, 2005

(65) Prior Publication Data

US 2008/0291386 A1 Nov. 27, 2008

(51) Int. Cl.
G02F 1/1335 (2006.01)
G02F 1/1333 (2006.01)

(52) U.S. Cl. .......................... 349/161; 349/59
(58) Field of Classification Search .................. 349/161, 349/59

See application file for complete search history.

(56) References Cited

U.S. PATENT DOCUMENTS

| | | | |
|---|---|---|---|
| 4,773,735 A | 9/1988 | Ukrainsky | 349/161 |
| 4,775,221 A | 10/1988 | Baumgartner, Jr. | 349/161 |
| 4,987,289 A | 1/1991 | Bishop | 219/209 |
| 5,029,982 A | 7/1991 | Nash | |
| 5,088,806 A | 2/1992 | McCartney et al. | |
| 5,189,535 A * | 2/1993 | Mochizuki et al. | 349/33 |
| 5,559,614 A | 9/1996 | Urbish | 349/21 |
| 5,696,529 A | 12/1997 | Evanicky et al. | |
| 5,748,269 A | 5/1998 | Harris et al. | |
| 5,767,489 A | 6/1998 | Ferrier | |
| 5,771,039 A | 6/1998 | Ditzik | |
| 5,886,763 A | 3/1999 | Wolkowicz | 349/161 |
| 5,926,243 A * | 7/1999 | Kim | 349/138 |
| 6,089,751 A | 7/2000 | Conover | 374/183 |
| 6,133,979 A * | 10/2000 | Komatsu et al. | 349/161 |
| 6,181,394 B1 * | 1/2001 | Sanelle et al. | 349/96 |
| 6,191,839 B1 | 2/2001 | Briley | |
| 6,341,879 B1 | 1/2002 | Skinner | |
| 6,400,435 B2 * | 6/2002 | Son et al. | 349/141 |
| 6,535,266 B1 * | 3/2003 | Nemeth et al. | 349/161 |
| 6,943,768 B2 | 9/2005 | Cavanaugh et al. | |
| 2002/0001056 A1 * | 1/2002 | Sandberg et al. | 349/123 |
| 2002/0097353 A1 | 7/2002 | Lee | |
| 2002/0097355 A1 * | 7/2002 | Kralik et al. | 349/86 |
| 2002/0101553 A1 | 8/2002 | Enomoto et al. | |
| 2002/0126248 A1 | 9/2002 | Yoshida | |

(Continued)

FOREIGN PATENT DOCUMENTS

| | | |
|---|---|---|
| JP | 03153212 | 11/1989 |
| JP | 09269507 | 3/1996 |
| JP | 11160727 | 12/1997 |

OTHER PUBLICATIONS

Zeef, Hubing, EMC analysis of 18' LCD Monitor, Aug. 2000, 1 page.

(Continued)

*Primary Examiner* — David Nelms
*Assistant Examiner* — Lauren Nguyen
(74) *Attorney, Agent, or Firm* — Standley Law Group LLP

(57) ABSTRACT

A flat panel display has an optically-transparent electrically-conductive layer, especially an indium tin oxide layer, directly formed on an outer front surface of a liquid crystal display (LCD) assembly having a front plate, a rear plate, and a layer of liquid crystal material interposed between said front and rear plates. The optically-transparent electrically-conductive layer is preferably uniform and functions as an integral heater when connected to a direct current power source.

19 Claims, 1 Drawing Sheet

U.S. PATENT DOCUMENTS

| | | |
|---|---|---|
| 2003/0007109 A1 | 1/2003 | Park |
| 2004/0075786 A1* | 4/2004 | Brandt et al. .................. 349/58 |
| 2004/0086449 A1* | 5/2004 | Rutherford et al. ........... 423/448 |
| 2004/0165139 A1 | 8/2004 | Anderson et al. |
| 2005/0073642 A1* | 4/2005 | Dunn et al. .................. 349/199 |
| 2005/0140833 A1* | 6/2005 | Lu et al. .......................... 349/14 |
| 2005/0286131 A1* | 12/2005 | Saxena et al. ................ 359/586 |
| 2007/0200977 A1 | 8/2007 | Egi et al. |

OTHER PUBLICATIONS

Jiang, Tai, A Flexible MEMS Technology and it First Application to Shear Stress Sensor Skin, 1997-1998, Department of Electrical Engineering California Institute, Pasadena, CA and Department of Mechanical and Aerospace Engineering University of California, Los Angeles, CA 6 pages.

* cited by examiner

FLAT PANEL DISPLAY WTIH EXTERNAL INTEGRAL HEATER

TECHNICAL FIELD

The present invention relates to a flat panel liquid crystal display (LCD). More particularly, in one embodiment, the flat panel display of the present invention has an optically transparent electrically conductive material coated on the front external LCD color plate glass surface under a front polarizer. This conductive material, particularly indium tin oxide (ITO), acts as an integral heater. The direct contact of the optically transparent electrically conductive material on the LCD front plate facilitates conductive heat transfer to the liquid crystal layer.

BACKGROUND AND SUMMARY OF THE INVENTION

The use of liquid crystals in flat panel displays has been practiced for some time. LCD panels are commonly used today in cellular phones, personal digital assistants (PDA), and aircraft instrument panels to communicate visual information to the user. A common LCD is fundamentally comprised of a liquid crystal material sandwiched between a front color plate and a rear Thin Film Transistor (TFT) plate, comprising a rigid plate (typically glass) and a thin film transistor array layer. Liquid crystal displays are temperature sensitive, with lower temperatures more adversely affecting display performance. As one example, military aircraft often need to be airborne in minutes from a cold start. Consequently, if the aircraft has been exposed to cold temperatures, critical LCDs must be either maintained in a warm condition or be quickly warmable to a proper operating temperature to function properly. To solve this problem, heaters have historically been integrated into panel designs by optically laminating or bonding a cover glass with an ITO coating heater to the front and/or rear of the LCD. However, these typical methods of employing a cover glass is costly (e.g., the heater glass is expensive) and electrical termination is labor intensive (i.e., required electrically conductive bus bars and associated wire/foil leads). Furthermore, these typical heating technologies add weight to the display, are prone to handling damage resulting in unusable LCDs, and also create optical problems due to reduced optical transmission and increased specular reflection of ambient light. Consequently, these typical LCDs have reduced image luminance and contrast and further require the use of optical index-matching layers to mitigate light loss. Accordingly, the present invention is directed to an apparatus and method for heating a liquid crystal display panel that substantially mitigates one or more of these problems due to limitations and disadvantages of the related art.

The apparatus and method of the present invention provides an LCD panel with an integral heater comprising an optically transparent electrically conductive layer, such as an ITO layer. A novel feature in one embodiment of this invention is that an ITO layer, positioned on an external face of the color plate and otherwise employed to drain electrical charge build up associated with the LCD image, is also used to heat the display. By directly coating the ITO layer onto the front surface of the LCD color plate, conductive heat transfer is enhanced and, consequently, the amount of electrical power required for heating is reduced. Furthermore, this direct coating approach eliminates the need for a separate external ITO heating layer to be laminated either onto the front of the LCD color plate or onto the rear of the TFT Plate. Electrical power needed to heat the display is applied through electrical connectors placed along the edges of the ITO heater layer to allow for the uniform injection of current into the ITO heater layer. This uniform current injection consequently promotes a more uniform and effective heating of the panel resulting in less distortion. This invention may be one and the same external color plate ITO layer as required for the operation of emerging LCD technologies such as Fringe Field Switching (FFS), which is commercially available through BOE HYDIS of Gyeonggi-do, Korea, and now licensed by Hitachi of Japan. In the FFS technology, an optically-transparent electrically-conductive layer serves as a charge draining or dissipating layer for the LCD. The ITO layer may or may not be coated on one or both sides with index matching dielectrics to improve optical transmission through the ITO coatings, and/or reduce the optical reflections at the front and/or rear surfaces of the ITO layer.

It is appreciated, as discussed in further detail below, that features of alternate embodiments discussed above may be combined to form additional alternative flat panel display designs. In addition to the features mentioned above, objects and advantages of the present invention will be readily apparent upon a reading of the following detailed description of a preferred embodiment.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF A PREFERRED EMBODIMENT

Figure 1:
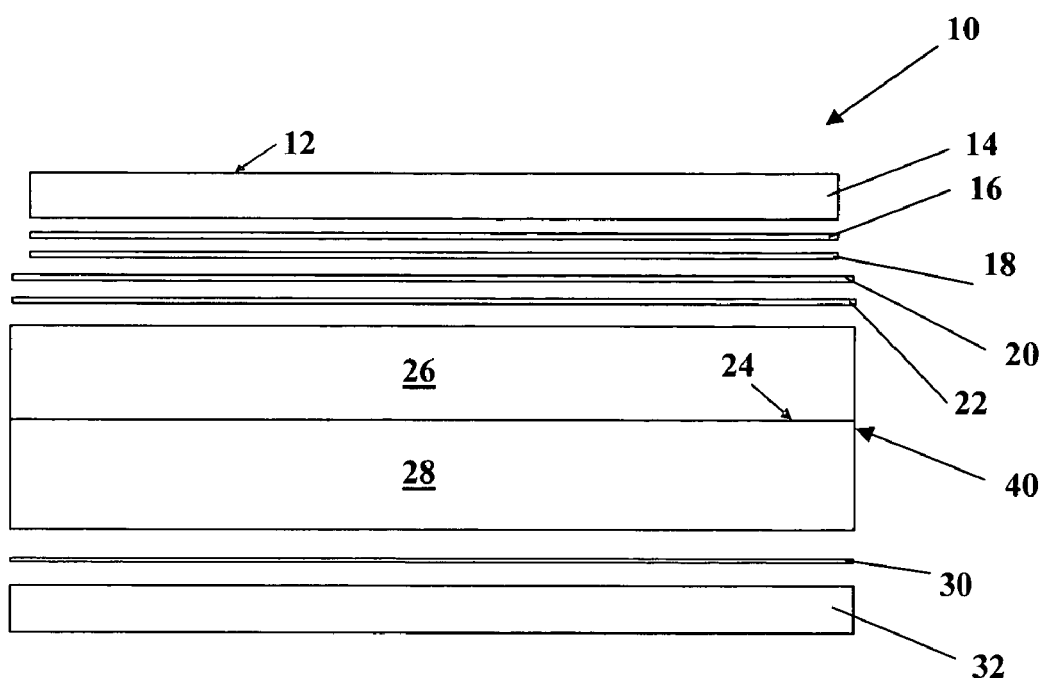
FIG. 1 illustrates a side elevation view one embodiment of the flat panel display of the present invention showing details of the layered construction.

FIG. 1 illustrates one embodiment of the flat panel display 10 of the present invention. According to known liquid crystal display (LCD) technology, a liquid crystal display 40 comprises a front plate 26 and a back plate 28, where the front plate is typically referred to as the color plate and the back plate is typically referred as the thin-film transistor (TFT) plate. Each of these plates is typically manufactured from glass. A thin layer of liquid crystal material 24 is contained in a thin cavity formed by known techniques between the plates 26, 28. In one embodiment of the present invention, a layer 20 of an optically transparent electrically conductive material is coated directly on the outer surface of the LCD color plate 26 under the front polarizer layer 14. A typical material for this optically transparent electrically conductive material is indium tin oxide (ITO), although other materials are known and may be successfully used. However, for purposes of this disclosure, the optically transparent electrically conductive layer will be referred to as the ITO layer 20. It is preferably sandwiched between an optional first index matching dielectric layer 18 and an optional second index matching dielectric layer 22. Selection of index matching material characteristics of these layers and the addition of an optional anti-reflective coating 12 helps keep the specular reflection to an absolute minimum, which also increases the optical transmission of the entire optical stack. Placing the ITO layer 20 and optional index matching layers 18 and 22 between the front polarizer 14 and the LCD color plate 26 provide advantages over known flat panel displays (i.e., current known processes apply the coatings on separate glass plates and not directly on the LCD plates). Placing the ITO layer 20, with or without index matching layers 18 and 22, directly on the LCD color plate 26 results in significant cost, weight, and thickness savings, as well as improved optical performance. The process embodied in this invention also provides a more efficient coupling of the heater ITO layer 20 to LCD fluid 24. This improved coupling results from having the ITO heater 20 coated directly on the surface of the front, or color, plate 26, thereby eliminating the thermal resistance caused in known implementations by an optical adhesive, polarizer and polarizer Pressure Sensitive Adhesive (PSA) layer. This reduces the thermal resistance between the ITO layer 20 and the liquid crystal layer 24 thus reducing the amount of power necessary to heat the liquid crystal layer. Furthermore, since there are fewer intervening layers between the ITO heater 20 and the liquid crystal layer 24, less power is needed to heat the liquid crystal layer.

In known configurations wherein separate heaters are mounted externally to the display, a typical power density of 2 watts per square inch of display image area is required to heat the LCD fluid from −54° C. to −20° C. in ≦10 minutes. With an ITO layer 20 coated directly on a front surface of the front plate 26, this same heating of the LCD fluid 24 can be accomplished with a lower power density.

It is known to apply an ITO layer 20 to the front plate 26. For example, the ITO layer 20 is used in the FFS technology commercially available through BOE HYDIS as a means for preventing charge build-up on the plate in association with the electric fields generated to drive the liquid crystal material into desired patterns on the display. In one embodiment of the present invention, this same ITO layer 20 is used to heat the display. If the ITO layer 20 were solely functioning as a heater layer, it might be desired to non-uniformly distribute the ITO across the outer surface of front plate 26, to take into account the heat losses around the plate periphery, due to the presence of an assembly bezel (not shown). However, such a non-uniform distribution so close to the liquid crystal layer 24 may interfere with the display presentation, due to a non-uniform electromagnetic field. The electrical resistance of the ITO layer 20 may vary as desired based on performance needs and size variables. In one embodiment, the ITO coating 20 is preferably a constant 15-20 ohms/sq value.

Pressure sensitive adhesive layers 16 and 30 are used to integrate the front and rear polarizers, 14 and 32 respectively, into the display 40. As illustrated in FIG. 1, the ITO layer 20 will be positioned internal to the display from the pressure sensitive adhesive layer 16, even if ITO layer 20 is not integral to front plate 26. The primary added cost associated with the use of ITO layer 20 is the addition of conventional electrical connectors, typically across a pair of opposing edges, so that a direct current voltage may be applied across the ITO layer 20. Attachment of such electrical connectors will be very well known to those of skill in this art, as it will not vary from other uses of ITO layers as external heater elements in LCDs.

In prior art flat panel displays, it is known to coat ITO layers onto separate glass plates which are then laminated to the outside of the LCD. This lamination process often results in bubble or particulate inclusions in the laminating material. Displays having bubble or particulate contamination are scrapped as unsatisfactory. Because the contamination is not detectable until the adhesive is dry and the display is fully assembled, a contaminated laminate layer results in the loss of an entire LCD assembly. Coating the ITO layer 20, with or without index matching layers 18 and 22, directly on the external front of the LCD color plate 26 avoids this high yield loss.

Placing the ITO layer 20 directly on the LCD color plate 26 also prevents the undesirable effects of lamination-induced window framing (LIWF). The lamination process described immediately above often employs an optical adhesive with a coefficient of thermal expansion ($C_{te}$) that differs from the layers to which it is adhered. As a result, one or both of the plates 26, 28 of the LCD 40 may bend or bow, changing the cell gap therebetween. This deformation locally changes the image contrast, typically causing "whitening" or "darkening" degradation of contrast around the edge or periphery of the display area (i.e., "halo" effect). The severity of this degradation changes with the age and operating temperature of the display. By skipping the step of laminating ITO coated glass plates to the outside surface of the polarizer layer, LIWF is avoided.

Placing the ITO layer 20 directly on the LCD color plate 26 further enhances optical performance. The present invention has a reduced specular reflection and increased contrast over known displays which have ITO coated glass plates laminated to the outside surface of the polarizers. By placing the ITO layer 20 under the front polarizer layer 14, less light is reflected from the display. In other words, because the front polarizer 14 is transmitting only a portion of the light from the outside (e.g., ~42% of the light is transmitted by the polarizer), a correspondingly smaller amount of that transmitted light is reflected by the ITO layer 20 between the polarizer 14 and the front plate 26. The ITO layer 20 and the optional index matching dielectric layers 18 and 22 of the present invention are applied using known manufacturing processes such as sputtering or vapor deposition.

It will be known from the prior art to have the appropriate edges of the ITO layer 20 extend past (e.g., ~0.25-1.00 mm) the outer edges of adjacent layers, to expose the ITO layer 20 for attachment of electrical connectors. A typical electrical connector, such as a bus bar, will provide a low impedance connection and allow for the uniform injection of current into the ITO heater layer 20. In one embodiment, an electrically-conductive low-ionic content silk screen epoxy, such as one loaded with silver, is laid onto the ITO heater layer 20 and then cured. This conductive epoxy is also used to bond or attach tin alloy plated copper foil leads to the bus bars to facilitate electrical connection of the heater drive voltage to the ITO heater. In another embodiment, the bus bar and heater leads are formed by a pair of flexible printed circuit (FPC) components, which are mechanically attached and electrically bonded to the exposed ITO using anisotropic conductive adhesive (ACF). Both the FPC and ACF materials and processes are well known in the industry.

To guard against electromagnetic interference (EMI) problems in sensitive environments (i.e., military applications, aircraft applications, etc.), the ITO coating 20 can act as an EMI shield if it electrically bonded or grounded to the associated metal or electrically conductive chassis of the complete LCD assembly 10 and/or its associated product chassis. This ITO EMI shield 20 significantly reduces radiated emissions originating from the LCD 10 itself, as well as shields, or reduces the susceptibility of, the LCD 10 from the effects of externally imposed electromagnetic fields. To effectively shield against EMI, one preferred embodiment electrically decouples the ITO heater layer 20 and its associated electrical connectors though capacitors to chassis ground. Since the ITO heater layer 20 is driven with a DC voltage, the capacitors can be readily selected to provide minimum impedance to chassis ground at the radio frequencies (RF) of interest. Therefore, the ITO heater layer 20 becomes an RF ground and attenuates radiated emissions, effectively serving as an EMI shield.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A flat panel display comprising:
a liquid crystal display (LCD) assembly comprising a front plate, rear plate, a layer of liquid crystal material interposed between the front and rear plates, and a thin film transistor (TFT) array interposed between the front and rear plates; a rear polarizer placed below the rear plate of the LCD; and a
a first layer of index-matching dielectric material formed on a face of the front plate opposite the liquid crystal material;
an electrically-conductive optically-transparent layer formed directly atop the first layer of index-matching dielectric material;
means for driving the electrically-conductive optically-transparent layer as a heater, said means in electrical communication with the electrically-conductive optically-transparent layer; and
a second layer of index-matching dielectric material formed directly atop the electrically-conductive optically-transparent layer and; a front polarizer place atop the second layer of index-matching dielectric material.

2. The display of claim 1 wherein:
the electrically-conductive optically-transparent layer operates as an EMI shield for the LCD.

3. The display of claim 1 further comprising:
an electrical ground in electrical connection with the means for driving the electrically-conductive optically-transparent layer as a heater.

4. The display of claim 3 further comprising:
a capacitor in electrical communication between the means for driving the electrically-conductive optically-transparent layer as a heater and the electrical ground.

5. The display of claim 1 further comprising:
a layer of pressure sensitive adhesive (PSA) between the front polarizer and the second layer of index-matching dielectric material.

6. The display of claim 5 further comprising:
a layer of pressure sensitive adhesive (PSA) between the rear polarizer and the rear plate of the LCD.

7. The display of claim 1 wherein:
the electrically-conductive optically-transparent layer has a non-uniform thickness.

8. The display of claim 1 wherein:
the electrically-conductive optically-transparent layer has a constant resistance value between 15 and 20 ohms/sq.

9. A flat panel display comprising:
a liquid crystal display (LCD) assembly comprising a front color plate, a rear plate, a layer of liquid crystal material interposed between the front color plate and rear plate, and a thin film transistor (TFT) array interposed between the front color plate and rear plate;
a rear polarizer placed below the rear plate of the LCD;
a first layer of index-matching dielectric material formed on a face of the front color plate opposite the liquid crystal material;
an electrically-conductive optically-transparent layer formed directly atop the first layer of index-matching dielectric material;
means for driving the electrically-conductive optically-transparent layer as a heater, said means in electrical communication with the electrically-conductive optically-transparent layer;
a second layer of index-matching dielectric material formed directly atop the electrically-conductive optically-transparent layer; and
a front polarizer placed atop the second layer of index-matching dielectric material.

10. The display of claim 9 further comprising:
an anti-reflective coating applied to the top surface of the front polarizer.

11. The display of claim 9 further comprising:
an electrical ground in electrical connection with the means for driving the electrically-conductive optically-transparent layer as a heater.

12. The display of claim 11 further comprising:
a capacitor in electrical communication between the electrically-conductive optically-transparent layer and the electrical ground.

13. The display of claim 9 further comprising:
a layer of pressure sensitive adhesive (PSA) between the front polarizer and the second layer of index-matching dielectric material.

14. The display of claim 13 further comprising:
a layer of pressure sensitive adhesive (PSA) between the rear polarizer and the rear plate of the LCD.

15. The display of claim 9 wherein:
the electrically-conductive optically-transparent layer has a non-uniform thickness.

16. The display of claim 9 wherein:
the electrically-conductive optically-transparent layer has a constant resistance value between 15 and 20 ohms/sq.

17. A device for heating a liquid crystal display (LCD) having a front plate, the heating device comprising:
a first layer of index-matching dielectric material formed on a face of the front plate opposite the liquid crystal material;
an electrically-conductive optically-transparent layer formed directly atop the first layer of index-matching dielectric material; and
a second layer of index-matching dielectric material formed directly atop the electrically-conductive optically-transparent layer.

18. The LCD heating device of claim 17 wherein:
the electrically-conductive optically-transparent layer has a constant resistance value between 15 and 20 ohms/sq.

19. The LCD heating device of claim 17 wherein:
the electrically-conductive optically-transparent layer has a non-uniform thickness.

* * * * *

UNITED STATES PATENT AND TRADEMARK OFFICE
CERTIFICATE OF CORRECTION

| | | |
|---|---|---|
| PATENT NO. | : 8,009,262 B2 | Page 1 of 1 |
| APPLICATION NO. | : 11/057888 | |
| DATED | : August 30, 2011 | |
| INVENTOR(S) | : William R. Dunn | |

It is certified that error appears in the above-identified patent and that said Letters Patent is hereby corrected as shown below:

On the title page, item (54), Title, please delete "FLAT PANEL DISPLAY WTIH EXTERNAL INTEGRAL HEATER" and insert --FLAT PANEL DISPLAY WITH EXTERNAL INTEGRAL HEATER--.

Signed and Sealed this
Twenty-second Day of November, 2011

David J. Kappos
*Director of the United States Patent and Trademark Office*

UNITED STATES PATENT AND TRADEMARK OFFICE
CERTIFICATE OF CORRECTION

PATENT NO. : 8,009,262 B2  
APPLICATION NO. : 11/057888  
DATED : August 30, 2011  
INVENTOR(S) : William R. Dunn Page 1 of 1

It is certified that error appears in the above-identified patent and that said Letters Patent is hereby corrected as shown below:

On the title page, item (54) and at Column 1, lines 1 and 2, Title, please delete "FLAT PANEL DISPLAY WTIH EXTERNAL INTEGRAL HEATER" and insert --FLAT PANEL DISPLAY WITH EXTERNAL INTEGRAL HEATER--.

This certificate supersedes the Certificate of Correction issued November 22, 2011.

Signed and Sealed this  
Third Day of January, 2012

David J. Kappos  
*Director of the United States Patent and Trademark Office*